United States Patent [19]
Pickel

[11] Patent Number: 5,540,495
[45] Date of Patent: Jul. 30, 1996

[54] INJECTION ASSEMBLY FOR AN INJECTION MOLDING MACHINE

[75] Inventor: Herbert Pickel, Planegg, Germany

[73] Assignee: Krauss Maffei Aktiengesellschaft, Munchen, Germany

[21] Appl. No.: 359,830

[22] Filed: Dec. 20, 1994

[30] Foreign Application Priority Data

Dec. 23, 1993 [DE] Germany ............ 43 44 335.4

[51] Int. Cl.⁶ .................................................. B29C 45/48
[52] U.S. Cl. .................... 366/78; 366/79; 92/2; 425/145
[58] Field of Search ............... 366/78, 79; 92/2, 92/33; 425/145, 149; 264/40.4

[56] References Cited

U.S. PATENT DOCUMENTS

| 3,510,915 | 5/1970 | Johansson | 92/2 X |
| 3,613,169 | 10/1971 | Ziegler | 366/78 |
| 3,808,953 | 5/1974 | Herbst | 92/2 |
| 3,822,057 | 7/1974 | Wheeler | 366/78 X |
| 3,865,354 | 2/1975 | Burpulis et al. | 366/78 X |
| 3,908,968 | 9/1975 | Bielfeldt et al. | 366/78 |
| 4,176,966 | 12/1979 | Bornemann | 366/78 |
| 4,693,676 | 9/1987 | Inaba | 366/78 X |
| 4,824,255 | 4/1989 | Wohlrab | 366/78 |
| 5,304,051 | 4/1994 | Meyer | 366/78 X |

FOREIGN PATENT DOCUMENTS

| 0204002 | 12/1986 | European Pat. Off. . | |
| 4206966 | 11/1992 | Germany . | |
| 60-132720 | 7/1985 | Japan | 366/78 |

Primary Examiner—David Scherbel
Assistant Examiner—Patrick F. Brinson
Attorney, Agent, or Firm—Herbert Dubno

[57] ABSTRACT

The extruder screw drive has a first and a second motor, a screw mechanism connected to the first motor and to the extruder screw for translating it in the extrusion cylinder, and a slide mechanism connected to the second motor and to the extruder screw for rotating it in the extrusion cylinder. The screw mechanism and the slide mechanism are coaxial and partially fit into one another to provide an axially compact arrangement. The motors can be hollow shaft electric motors axially aligned together, and pressure regulated hydraulic axial force can be added to the extruder screw during plasticating as it retracts due to increased volume of plastic at an output end of the extrusion cylinder.

18 Claims, 2 Drawing Sheets

INJECTION ASSEMBLY FOR AN INJECTION MOLDING MACHINE

SPECIFICATION

1. Field of the Invention

My present invention relates to an injection assembly for an injection molding machine of the type having an extrusion screw cylinder, an extruder screw and a screw drive having two electric motors, one of which is used for turning the feed screw and the other of which is used for axial movement of the feed screw. More particularly, the invention relates to a drive apparatus for the extruder screw of screw plasticating injection molding equipment.

2. Background of the Invention

An injection molding machine of this type is known from European Patent 0 204 002 in which the drive apparatus for the extrusion screw consists of two electric motors, one for the injection process and the other for the plastication process. Both motors are provided parallel to one another relatively far apart. Substantial power transmission devices are required for performing the necessary turning and axial movements.

German patent publication 42 06 966 to Tetra Pak Romont describes an extrusion screw drive system which has a pulley wheel through which a shaft slides which is connected to the extrusion screw for turning the same. A lead screw is also connected to the shaft and threaded into a complementary feed screw which is free to turn with the extrusion screw during plasticating. During injection, a clutch locks the feed screw so that turning the shaft advances (or retracts) the lead screw and thus the extrusion screw to push out the molten plastic.

OBJECTS OF THE INVENTION

It is an object of the present invention to improve a device of the above-described type such that the size of the power transmission device is reduced as much as possible and hence yields a compact construction.

Another object is to provide an improved plasticating and injection machine which overcomes drawbacks of prior art systems.

SUMMARY OF THE INVENTION

These objects are achieved by arranging two electric motors with their axes in line with the axis of the extrusion screw with at least one of the electric motors having a hollow shaft.

As a result of the power transmitted by the motors directly to the drive axle connected to the extrusion screw, a high efficiency is achieved resulting in considerably reduced required operating power.

Due to the fact that the essential elements such as the axle nut (feed screw), the drive axle (lead screw) and the drive stem are arranged inside of the hollow shaft of the motors, the bulk of the entire drive apparatus is substantially determined only by the exterior dimensions of the motors. It thus provides the advantage of a simple enclosure for the motors such that the drive apparatus according to the invention is particularly suitable for operation in clean room conditions. The lack of transmission elements (e.g. belt drives) also is advantageous in this respect since no dust particles can be generated as in the case with belt drives.

In a preferred embodiment of the invention, an inner cylinder is provided inside the drive axle in which a piston is inserted, the piston being connected to the drive stem. A conduit leading to a hydraulic tank through the piston and the drive stem to a regulator valve allows hydraulic oil to flow from the inner cylinder under hydraulic load of the feed screw to the tank whereby the desired hydraulic pressure is assured by the regulator valve.

Preferably, the motors are transverse flux motors having a high torque and, on the one hand, comprise the advantageous shortness or disc-shaped construction for the invention and, on the other hand, provide a wide interior diameter inside the hollow shaft.

Preferably, both motors are hollow shaft electric motors arranged or "stacked" disc-like next to one another. The housings of both hollow shaft motors can be connected to one another, wherein one of the housings is connected to the housing of the extruder screw cylinder. A first one of the motors can have an axle nut or feed screw mounted in a hollow shaft thereof, the nut or feed screw being threaded on a drive shaft or lead screw connected at one end to the extruder screw and connected at another end to a drive stem. The drive stem can have an axial groove corresponding to an axial ridge or key in the inside of the drive shaft to turn therewith while allowing axial movement, with the drive stem being connected to a hollow shaft of a second one of the motors.

The feed screw or nut can be integral with the hollow shaft solidly connected to the armature of a first one of the motors, and the hollow shaft of the second motor can be rigidly connected to the drive stem leaving an annular space for receiving the drive axle. An axial bearing (thrust bearing) for withstanding axial forces from the feed screw may be integrated in the first hollow shaft motor.

The hollow shaft motors are preferably speed-controllable motors and may be transverse flux motors having cylindrical magnets surrounded on both sides by windings. Also, both motors are preferably driven with a differential speed in accordance with measured control signals indicative of the state of melting in the extruder screw cylinder.

BRIEF DESCRIPTION OF THE DRAWING

A preferred embodiment of the invention will be described in detail with reference to the appended drawing, in which.

SPECIFIC DESCRIPTION

Figure 1:
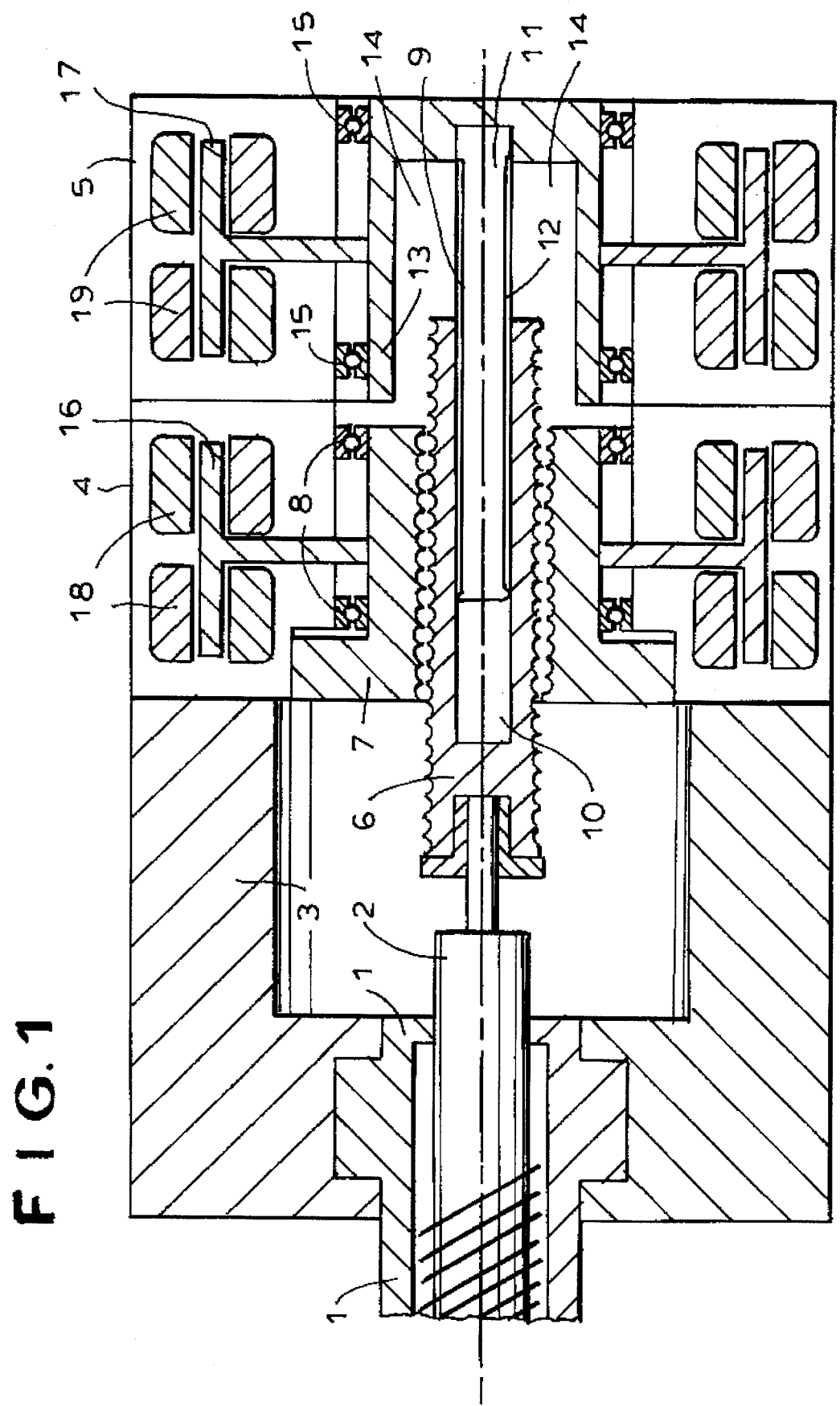
FIG. 1 is a longitudinal cross-section of the drive system of an injection apparatus of a screw plasticating injection molding machine.

FIG. 1 shows the rear portion of extrusion screw cylinder 1 and of the extrusion screw 2 contained therein of an injection molding machine otherwise not shown. The extrusion screw cylinder 1 is connected to a housing 3 on which a first hollow shaft motor 4 and a second hollow shaft motor 5 are mounted. The extrusion screw 2 is rigidly connected to a drive shaft or axle 6 seated in an axle nut (feed screw) 7. A ball bearing or circulating ball screw drive system is used. The axle nut 7 is the hollow shaft of the first hollow shaft motor 4 which is mounted directly in the motor housing by means of an axial bearing 8.

A drive stem 11 projects into a cavity 10 in the drive shaft 6. The cavity is provided with an axial ridge 9 which mates with an axial groove 12 of the stem 11, such that the drive shaft turns with the stem 11 while being axially mobile thereon. The drive stem 11 is solid with the hollow shaft of the second hollow shaft motor 5, the hollow shaft surrounding the stem 11 leaving an annular space 14. The hollow shaft 13 is supported directly in the motor housing by an axial bearing 15.

The hollow shaft motors 4 and 5 are transverse flux motors having cylindrical magnets 16 and 17, each surrounded on both sides by windings 18 and 19.

Figure 2:
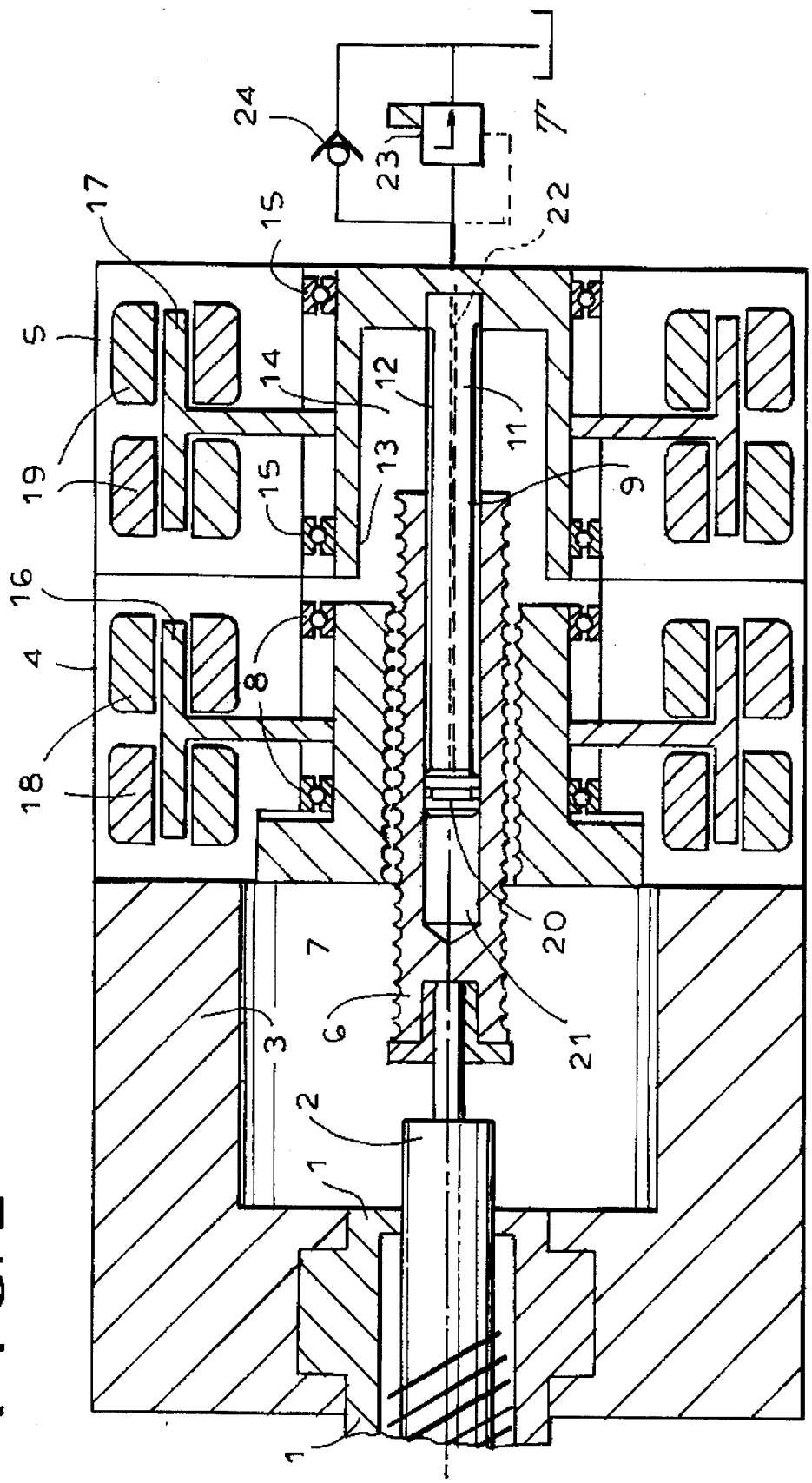
FIG. 2 shows the embodiment of FIG. 1 having an additional hydraulic device to ensure the desired back pressure.

In the embodiment of FIG. 2, the drive stem 11 is provided with a piston 20 inserted into inner cylinder 21. A conduit 22 extends through piston 20 and stem 11 from cylinder 21 to a regulating valve 23 to a tank T. When there is an overpressure on extrusion screw 2, hydraulic oil flows from cylinder 21 into tank T. When the extrusion screw is returned, hydraulic oil is drawn from tank T through check valve 24 back into cylinder 21.

In operation, the extrusion screw 2 carries out two main movements. During injection, extrusion screw 2 is pushed forward and not rotated. During plastication, extrusion screw 2 is rotated and pushed axially back by the plasticized material pressed into the extrusion screw end chamber (not showned). As a result, a definite resistance force (back pressure) is generated.

During injection and plastication, the hollow shaft motors 4 and 5 are operated as follows:

Injection:

The first motor 4 turns nut 7 and extrusion screw 6 is pushed axially (to the left in FIGS. 1 and 2). The second motor 5 does not turn.

Plastication:

The second motor 5 turns extrusion screw 2 using stem 11 with the required plastifying torque (pressure).

The first motor 4 turns with approximately the same speed as the second motor 5. The speed differential results in the speed of withdrawal of extrusion screw 2 for accommodating the plasticated material filling the extrusion screw end chamber.

As can be appreciated, the nut 7 and threaded drive shaft 6 provide screw means for advancing and retracting screw 2. Stem 11, cavity 10, ridge key 9 and groove 12 provide slide means for turning the extrusion screw 2. While in the preferred embodiment, the lead screw drive shaft 6 is provided with cavity 10 and thus receives stem 11, it is also possible to reverse the arrangement and connect a larger diameter grooved keyed collar to motor 4 for turning a slideable shaft connected to screw 2. A threaded bore in the slideable shaft would receive a threaded shaft connected to motor 5 like stem 11. This reverse arrangement has the disadvantage that the piston arrangement of FIG. 2 cannot be implemented. It can also be appreciated that an axially compact drive is provided by having the screw means and the slide means fit into one another. Additional size reduction is provided by using a hollow shaft motor 5 which receives an axially translatable member of the screw means or the slide means, as the case may be.

I claim:

1. An injection assembly for an injection molding machine for processing of thermoplastic material, comprising:

an extruder screw cylinder;

an extruder screw rotatable and axially shiftable in said cylinder; and an extruder screw drive connected to said extruder screw, said extruder screw having two electric motors, one of said motors being operatively connected to said extruder screw for turning the extruder screw and another of said motors being operatively connected to said extruder screw for axial movement of the extruder screw, both of said electric motors being mounted with their axes aligned with an axis of the extruder screw and at least one said motors being a hollow shaft motor, both said motors being hollow shaft motors, said motors being in the form of disks next to one another.

2. The injection apparatus defined in claim 1 wherein said hollow shaft motors have respective housings, the housings of both hollow shaft motors are connected to one another, and one of said housings of said motors is connected to a housing in which said extruder screw cylinder is provided.

3. The injection assembly defined in claim 1 wherein a first of said motors has an axle nut mounted in a hollow shaft thereof, said nut being threaded on a drive shaft connected at one end to said extruder screw and connected at another end to a drive stem, the drive stem having an axial groove corresponding to an axial ridge in the inside of the drive shaft to turn therewith while allowing axial movement, wherein said drive stem is connected to a hollow shaft of a second of said motors.

4. The injection asesmbly defined in claim 3 wherein said nut is a hollow shaft rigidly connected to the armature of the first of said motors, said hollow shaft of said second of said motors being rigidly connected to the drive stem, leaving an annular space for receiving said drive axle.

5. The injection assembly defined in claim 3 wherein an axial bearing for withstanding axial forces from said nut is integrated in said first of said hollow shaft motors.

6. The injection assembly defined in claim 1 wherein each of said hollow shaft motors is a transverse flux motor having cylindrical magnets surrounded on both sides by windings.

7. An injection assembly for an injection molding machine for processing of thermoplastic material, comprising:

an extruder screw cylinder;

an extruder screw rotatable and axially shiftable in said cylinder; and an extruder screw drive connected to said extruder screw, said extruder screw having two electric motors, one of said motors being operatively connected to said extruder screw for turning the extruder screw and another of said motors being operatively connected to said extruder screw for axial movement of the extruder screw, both of said electric motors being mounted with their axes aligned with an axis of the extruder screw and at least one said motors being a hollow shaft motor, at least one of said two motors being speed controllable.

8. The injection assembly defined in claim 7 wherein both said motors are driven with a differential speed in accordance with measured control signals indicative of the state of melting in said extruder screw cylinder.

9. The injection assembly defined in claim 3 wherein said drive shaft comprises an inner cylinder filled with hydraulic fluid in which a piston provided at one end of said drive stem is inserted, wherein an outward leading conduit passes through said piston and through said drive stem, said conduit conducting hydraulic fluid which passes through a pressure regulating valve to a reservoir tank as a result of back pressure on said extruder screw, hydraulic fluid being conducted from said reservoir tank in the reverse direction through a check valve during a return movement of said extruder screw.

10. The injection assembly defined in claim 3 wherein said drive shaft inserted into said nut is a ball bearing shaft.

11. An extruder screw drive apparatus for a screw plasticating injection molding machine having an extruder screw rotatable and slideable in an extrusion screw cylinder, said apparatus comprising:

a first and a second motor;

screw means connected to said first motor and to said extruder screw for translating said extruder screw in said cylinder; and slide means connected to said second motor and to said extruder screw for rotating said extruder screw in said cylinder, said screw means and said slide means being coaxial, said screw means and said slide means fitting partially into one another, whereby an axially compact arrangement is provided.

12. The apparatus as defined in claim 11 wherein said screw means comprise a feed screw and a lead screw connected to said extruder screw, and said slide means comprise a drive stem and a cylindrical cavity in said lead screw, said feed screw being rigidly connected to said first motor for driving said lead screw forward and backward when said lead screw is rotationally stationary, said stem being connected to said second motor and slideable in said cavity while turning said lead screw.

13. The apparatus as defined in claim 12 wherein said first motor is a hollow shaft motor, said feed screw being mounted inside said hollow shaft.

14. The apparatus as defined in claim 13 wherein said second motor is a hollow shaft motor, said hollow shaft partially receiving said lead screw when said extruder screw is retracted.

15. The apparatus as defined in claim 12 wherein said stem is provided with a groove receiving a ridge key at an orifice of said cavity, a piston at one end inside said cavity and a conduit communicating with said cavity, whereby fluid pressure in said cavity can be used for exerting axial force assisting said screw means.

16. The apparatus as defined in claim 15, further comprising a fluid reservoir, a regulator valve communicating overpressure fluid from said conduit to said reservoir, and a check valve communicating fluid from said reservoir to said conduit when under negative pressure, whereby said regulator valve maintains a predetermined pressure on said extruder screw during plasticating as it retracts due to increased volume of plastic at an output end of said extrusion cylinder, and said check valve allows fluid to refill said cavity during injection and return of said extruder screw.

17. The apparatus as defined in claim 12 wherein said motors are speed regulated.

18. The apparatus as defined in claim 17 wherein a differential speed of said motors for controlling retraction of said extruder screw during plasticating is set according to a measured state of melting in said extrusion cylinder.

* * * * *